United States Patent
Busson et al.

(10) Patent No.: US 7,149,485 B2
(45) Date of Patent: Dec. 12, 2006

(54) METHOD AND DEVICE FOR PROCESSING MISMATCHES BETWEEN TWO QUADRATURE PATHS OF A CHAIN OF A RECEPTION ADAPTED FOR EXAMPLE TO THE RECEPTION OF A SIGNAL MODULATED ACCORDING TO A MODULATION OF THE OFDM TYPE

(75) Inventors: Pierre Busson, Grenoble (FR); Bruno Paille, Saint Aupre (FR)

(73) Assignee: STMicroelectronics SA, Montrouge (FR)

( * ) Notice: Subject to any disclaimer, the term of this patent is extended or adjusted under 35 U.S.C. 154(b) by 316 days.

(21) Appl. No.: 10/919,796

(22) Filed: Aug. 17, 2004

(65) Prior Publication Data

US 2005/0208895 A1    Sep. 22, 2005

(30) Foreign Application Priority Data

Aug. 18, 2003   (FR) .................................. 03 09988

(51) Int. Cl.
*H04B 1/18* (2006.01)
*H04B 1/04* (2006.01)

(52) U.S. Cl. ............... 455/183.1; 455/323; 455/130; 455/165.1

(58) Field of Classification Search ........ 455/142–145, 455/323, 118, 130, 131, 67.13, 150.1, 165.1, 455/183.1, 216; 375/316, 346, 296; 332/103
See application file for complete search history.

(56) References Cited

U.S. PATENT DOCUMENTS

| | | | |
|---|---|---|---|
| 5,963,592 A | 10/1999 | Kim | 375/232 |
| 6,452,981 B1 | 9/2002 | Raleigh et al. | 375/299 |
| 6,760,577 B1 * | 7/2004 | Li | 455/323 |
| 6,785,529 B1 * | 8/2004 | Ciccarelli et al. | 455/324 |
| 6,898,252 B1 * | 5/2005 | Yellin et al. | 375/296 |
| 6,999,744 B1 * | 2/2006 | Kim | 455/310 |
| 7,088,765 B1 * | 8/2006 | Green et al. | 375/142 |
| 2003/0035470 A1 | 2/2003 | Gu | 375/219 |
| 2003/0236073 A1 * | 12/2003 | Wetzker | 455/67.11 |
| 2004/0092241 A1 * | 5/2004 | Kim et al. | 455/255 |
| 2004/0152436 A1 * | 8/2004 | Masenten et al. | 455/323 |
| 2005/0260949 A1 * | 11/2005 | Kiss et al. | 455/67.14 |
| 2006/0068739 A1 * | 3/2006 | Maeda et al. | 455/295 |
| 2006/0133548 A1 * | 6/2006 | Oh et al. | 375/346 |

OTHER PUBLICATIONS

Toso et al., 0.5-μm CMOS Circuits for Demodulation and Decoding of an OFDM-Based Digital TV Signal Conforming to the European DVB-T Standard, IEEE Journal of Solid-State Circuits, IEEE Inc., New York, US, vol. 33, No. 11, Nov. 1998, pp. 1781-1791.

(Continued)

*Primary Examiner*—Sonny Trinh
(74) *Attorney, Agent, or Firm*—Lisa K. Jorgenson; Allen, Dyer, Doppelt, Milbrath & Gilchrist P.A.

(57) ABSTRACT

In a calibration phase for a tuner of the DZIF type, N calibration frequency signals are generated at an input of a filter. The N calibration frequency signals have N calibration frequencies corresponding respectively after transposition to N analysis frequencies at an input of a Fourier transform. An amplitude and a phase of a corresponding point at an output of the Fourier transform are calculated for each analysis frequency. In a reception phase, each of the outputs of the Fourier transform is corrected with an inverse of the corresponding amplitude and opposite the corresponding phase calculated in the calibration phase.

33 Claims, 4 Drawing Sheets

OTHER PUBLICATIONS

Bruhl et al., Unified Spatio- Temporal Frequency Domain Equalization for Multi and Single-Carrier CDMA Systems, VTC 2002-Fall., 2002 IEEE 56th Vehicular Technology Conference Proceedings, Vancouver, Canada, Sep. 24-28, 2002, IEEE Vehicular Technology Conference, New York, NY, US, vol. 1 of 4, Conf. 56, Sep. 24, 2002, pp. 676-680.

* cited by examiner

METHOD AND DEVICE FOR PROCESSING MISMATCHES BETWEEN TWO QUADRATURE PATHS OF A CHAIN OF A RECEPTION ADAPTED FOR EXAMPLE TO THE RECEPTION OF A SIGNAL MODULATED ACCORDING TO A MODULATION OF THE OFDM TYPE

FIELD OF THE INVENTION

The invention relates to the decoding and coding of radio frequency transmission channels conveying coded digital information. The invention relates more particularly to the estimation and the correction of mismatches between the I and Q paths of a reception chain (tuner plus demodulator) receiving an incident analog signal modulated according to a modulation on N carriers, for example, a digital quadrature modulation on a large number of orthogonal carriers, such as Orthogonal Frequency Division Multiplexing (OFDM) modulation.

The invention thus applies advantageously but not limited to wireless local area networks (WLAN), such as those defined by the 802.11A standard.

The invention also applies advantageously to terrestrial digital television, that is, signals transmitted between television antennas as defined in the Digital Video Broadcasting—Terrestrial (DVB-T) European specification, and to cable digital television as defined in the Digital Video Broadcasting—Cable (DVB-C) European specification. These broadcasts are based on the MPEG transmission standards and use, for example, a modulation of the OFDM type to convey the information.

BACKGROUND OF THE INVENTION

The receivers, whether they are dedicated to the reception of digital television signals or whether they belong to wireless local area networks, comprise a tuner exhibiting an architecture of the Zero Intermediate Frequency (ZIF) type or of the DZIF type, (i.e., double downconversion). The tuner selects the desired channel from the channels of the incident signal and outputs a baseband signal on an in-phase path (I path) and on the quadrature path (Q path). This signal is then converted into a digital signal and demodulated.

The frequency transposition on two paths, which brings the signal back to baseband, leads to mismatches in phase and amplitude between these two paths. Also, modulation of the OFDM type is particularly sensitive to this type of problem.

Currently, specific approaches of correcting these mismatches, such as those described in U.S. Pat. No. 6,044,112 or in French Patent Application No. 203,256, are provided in the digital block comprising in particular the demodulator.

SUMMARY OF THE INVENTION

An object of the invention is to provide a method for estimating and correcting mismatches between the two quadrature paths of a reception chain.

The invention makes use of approaches of the hardware elements already provided to perform the demodulation of the incident signal. The method is particularly well suited to being fully integrated on a single chip.

This object is provided by a method for processing an incident analog signal modulated according to a modulation on N carriers, for example a modulation of the OFDM type. The method comprises frequency transposition of an intermediate signal arising from the incident signal on two phase quadrature processing paths by using a predetermined transposition frequency, an analog digital conversion of the transposed signal and a demodulation by a Fourier transform of size N.

According to a general characteristic of the invention, the process comprises a calibration phase in which, before transposition, N calibration frequency lines (i.e., signals) having respectively N calibration frequencies corresponding respectively after transposition to N analysis frequencies at the input of the Fourier transform are generated. In this calibration phase, the amplitude and the phase of the corresponding point at the output of the Fourier transform may be calculated for each analysis frequency.

The method furthermore comprises an incident signal reception phase in which each of the outputs of the Fourier transform is corrected at least with the inverse of the corresponding amplitude and with the opposite of the corresponding phase that are calculated in the calibration phase. The mismatches between the I and Q paths of the reception chain are thus estimated and corrected.

When the tuner is of the zero intermediate frequency type (ZIF architecture) and the incident signal comprises several frequency channels, the intermediate signal arises from the incident signal without prior frequency transposition, and the predetermined transposition frequency is equal to the center frequency of the desired channel. Thus, the signal is converted directly into baseband and baseband bandpass filters select the desired channel. Also in this variation, the frequency lines are advantageously generated at the input of the frequency transposition stage.

As a variation, when the tuner is of the double conversion type (DZIF architecture), provision may be made for filtering the incident signal by a filter centered on a predetermined intermediate frequency after the first frequency transposition, to obtain the intermediate signal. The transposition frequency of the second transposition stage is equal to the intermediate frequency. Also in this variation, the calibration frequency lines are generated at the input of the filter.

According to a mode of implementation of the invention, a usual analysis frequency is equal to kFe/N, with k varying from 0 to N-1, and where Fe designates the sampling frequency at the input of the Fourier transform. In the reception phase, the output k of the Fourier transform is then multiplied by a complex product comprising the inverse of the corresponding amplitude and the opposite of the corresponding phase, calculated in the calibration phase.

When the filtering circuit comprises a filter requiring a specific calibration, such as for example in the case of filters of the bulk acoustic wave type (BAW filters), to ascertain in particular their center frequency and their amplitude response, provision may be advantageously made for the method to also comprise a phase of additional calibration of the filter comprising a determination of the amplitude response to the filter. In the incident signal reception phase each of the outputs of the Fourier transform is corrected with the inverse of the corresponding amplitude calculated in the calibration phase and corrected by the amplitude response of the filter, and with the opposite of the corresponding phase calculated in the calibration phase.

In this case, and according to a mode of implementation of the invention, in the reception phase, the output k of the Fourier transform is multiplied by a complex product comprising the opposite of the corresponding phase calculated in the calibration phase, and the inverse of the corresponding amplitude calculated in the calibration phase and corrected by the amplitude response of the filter.

The calibration frequency lines may be generated for example in two different ways. According to a first variation of the invention, in the calibration phase, the N calibration signals are generated in succession with an autonomous synthesizer. This is particularly well suited to the calibration of a monodirectional system or when only the reception path is available, in particular in the case where the incident signal is a terrestrial or cable digital television signal.

According to a second variation of the invention, in the calibration phase a unique calibration signal composed of the spectrum of the N frequency lines may be generated on the basis of an inverse Fourier transform and of a digital analog conversion. This is particularly well suited to the case of a bi-directional system, for example in accordance with the 801.11A standard in which the system comprises a receiver and a transmitter of the OFDM type, for example. This applies also to the systems implementing simultaneous transmission and reception (full duplex mode).

Another aspect of the invention is directed to a device for processing an incident signal modulated according to a modulation on N carriers, comprising a frequency transposition stage receiving a transposition signal having a predetermined transposition frequency to perform a frequency transposition of an intermediate signal arising from the incident signal on two phase quadrature processing paths. One stage is for analog digital conversion of the transposed signal, and a demodulator provides demodulation by Fourier transform of size N.

According to a general characteristic of the invention, the device comprises generating circuits. During a calibration phase, N calibration frequency lines are generated upstream of the frequency transposition stage. The N Calibration frequency lines have N calibration frequencies corresponding respectively after transposition to N analysis frequencies at the input of the Fourier transform. A calculation circuit calculates for each analysis frequency the amplitude and the phase of the corresponding point of the output of the Fourier transform. A correction circuit, during a reception phase, corrects each of the outputs of the Fourier transform at least with the inverse of the corresponding amplitude and the opposite of the corresponding phase that are calculated by the calculation circuit.

According to an embodiment suited for example to an architecture of the ZIF type, and when the incident signal comprises several frequency channels, the intermediate signal may arise from the incident signal without prior frequency transposition and the predetermined transposition frequency is equal to the center frequency of the desired channel.

According to an embodiment suited for example to an architecture of the DZIF type, the device may furthermore comprise a filter for filtering the incident signal centered on a predetermined intermediate frequency to deliver the intermediate signal. The transposition frequency is equal to the intermediate frequency, and the generating circuits generate the calibration frequency lines (i.e., signals) at the input of the filter.

According to an embodiment of the invention, a usual analysis frequency is equal to kFe/N, with k varying from 0 to N-1, and Fe designates the sampling frequency of the Fourier transform circuit. In the reception phase, the correction circuit multiplies the output k of the Fourier transform by a complex product comprising the inverse of the corresponding amplitude and the opposite of the corresponding phase, calculated in the calibration phase.

According to an embodiment of the invention, the device may comprise an additional calibration circuit that is able during a phase of additional calibration of the filter, to determine the amplitude response of the filter, and in the incident signal reception phase the correction circuit is able to correct each of the outputs of the Fourier transform with the inverse of the corresponding amplitude calculated in the calibration phase and corrected by the amplitude response of the filter, and with the opposite of the corresponding phase calculated in the calibration phase.

In this case, and according to an embodiment of the invention, in the reception phase, the correction circuit multiplies the output k of the Fourier transform by a complex product comprising the opposite of the corresponding phase calculated in the calibration phase and the inverse of the corresponding amplitude calculated in the calibration phase and corrected by the amplitude response of the filter.

The filtering circuit may comprise a filter of the bulk acoustic wave type. Moreover, the generating circuits may comprise an autonomous synthesizer for generating in succession the N calibration signals. As a variation, the generating circuits may comprise inverse Fourier transform circuit and a digital analog conversion stage to generate a unique calibration signal composed of the spectrum of the N frequency lines.

The device according to the invention is advantageously embodied within an integrated circuit. This integrated circuit may also incorporate the tuner portion of a receiver of terrestrial or cable digital television signals, or of a transmission/reception device of a wireless local area network.

BRIEF DESCRIPTION OF THE DRAWINGS

Other advantages and characteristics of the invention will become apparent on examining a detailed description of embodiments and modes of implementation, that are in no way limiting, and of the appended drawings, in which.

DETAILED DESCRIPTION OF THE PREFERRED EMBODIMENTS

Figure 1:
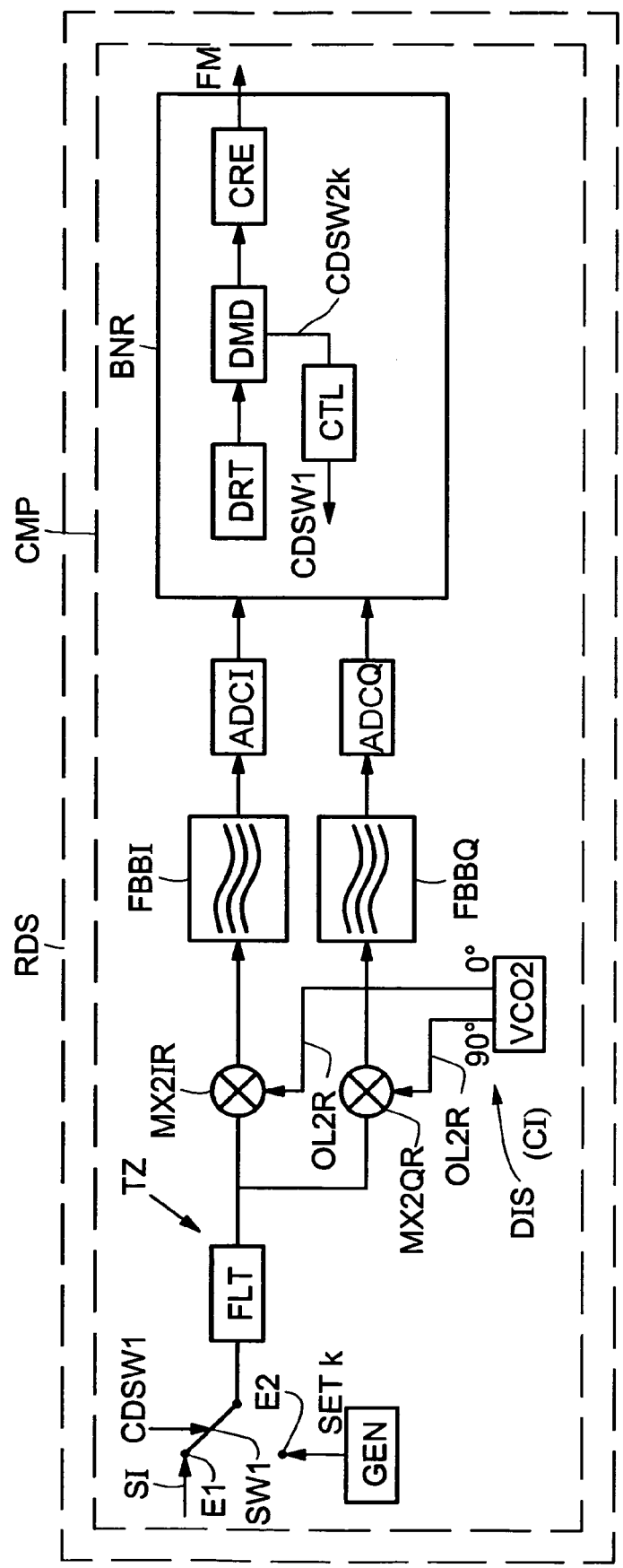
FIG. 1 is a block diagram illustrating a first embodiment of a device according to the invention.

In FIG. 1, the reference DIS designates a device according to the invention, and comprises at the head end a filter FLT having a center frequency equal to a predetermined intermediate frequency, for example 1220 MHz. The input of the filter FLT is linked by a switch SW1 controlled by a control signal CDSW1, either to the input E1 receiving the modulated analog incident signal, or to an input E2 receiving, as will be seen in greater detail below, calibration lines SETk transmitted by a generator GEN.

The filter FLT forms part of a tuning module or tuner TZ, which in this example is of the double conversion type (DZIF), and selects a channel from the set of channels present in the signal received at the input of the tuner. The tuner itself forms part of a component CMP embodied for example within an integrated circuit CI (chip) formed entirely in CMOS technology on a monolithic silicon substrate.

The component CMP may be incorporated at the head end of a receiver RDS connected to an antenna picking up terrestrial digital television signals. When the signals, modulated for example according to an OFDM type modulation, are terrestrial digital television signals, the set of channels contained in the signal received at the input of the tuner lies in a frequency band between 45 MHz–860 MHz.

In this case, the tuner TZ may for example be of the double conversion type, with up conversion followed by down conversion to baseband. The first up conversion brings the signal SI on the input E1 back to the intermediate frequency. In this case, the transposition signal performs the first up frequency transposition to a frequency preferably equal to the sum of the frequency of the desired channel and of the center frequency (intermediate frequency) of the bandpass filter FLT.

When the component CMP is incorporated into a transmission/reception device capable of picking up analog signals modulated according to a modulation of the OFDM type, and formed of several channels stretching over the 5 GHz–6 GHz frequency band, for example in the case of a wireless transmission local area network in accordance with the 802.11A standard, the tuner TZ comprises a reception path, for example of the type with double down conversion to baseband. In this case, the frequency of the first frequency transposition signal is equal to the channel frequency desired minus the center frequency of the filter FLT.

The reception path of the device DIS (i.e., the tuner), is continued downstream of the filter FLT by a second frequency transposition stage formed by two mixers MX2IR and MX2QR. These two mixers belong respectively to the I path and to the Q path which are in phase quadrature.

The mixer of the I path (in-phase path) receives a frequency transposition signal OL2R arising for example from a voltage controlled oscillator VCO2. Moreover, the mixer MX2QR, which belongs to the Q path, receives the same signal OL2R but 90° out of phase relative to that delivered to the mixer MX2IR. The frequency of the transposition signal OL2R applied to the two mixers MX2IR and MX2QR is equal to the center frequency of the filter FLT. The two mixers MX2IR and MX2QR are respectively followed by two bandpass filters FBBI and FBBQ.

An analog/digital conversion stage ADCI, ADC links the output of the reception path of the tuner to a digital reception block BNR. This block BNR comprises correction circuit DRT (derotator) for correcting the phase noise, the frequency drift and the frequency shifting of the frequency synthesizers. The correction circuit DRT is also used to compensate for the bandpass filtering FBBI, FBBQ and thus prevent the obtaining of too small an error margin for the interpretation of the frequency spectrum. This approach for derotation may for example be as described in European Patent Application No. 481,543.

The correction circuit DRT is followed by a demodulator DMD, itself followed by an error correction stage CRE performing conventional error correction processing well known to those skilled in the art. The error correction may be based upon forward error correction (FEC). The error correction stage then delivers a stream FM which will be decoded in a source decoding block external to the component CMP, and in accordance with the MPEG standard for example.

Figure 2:
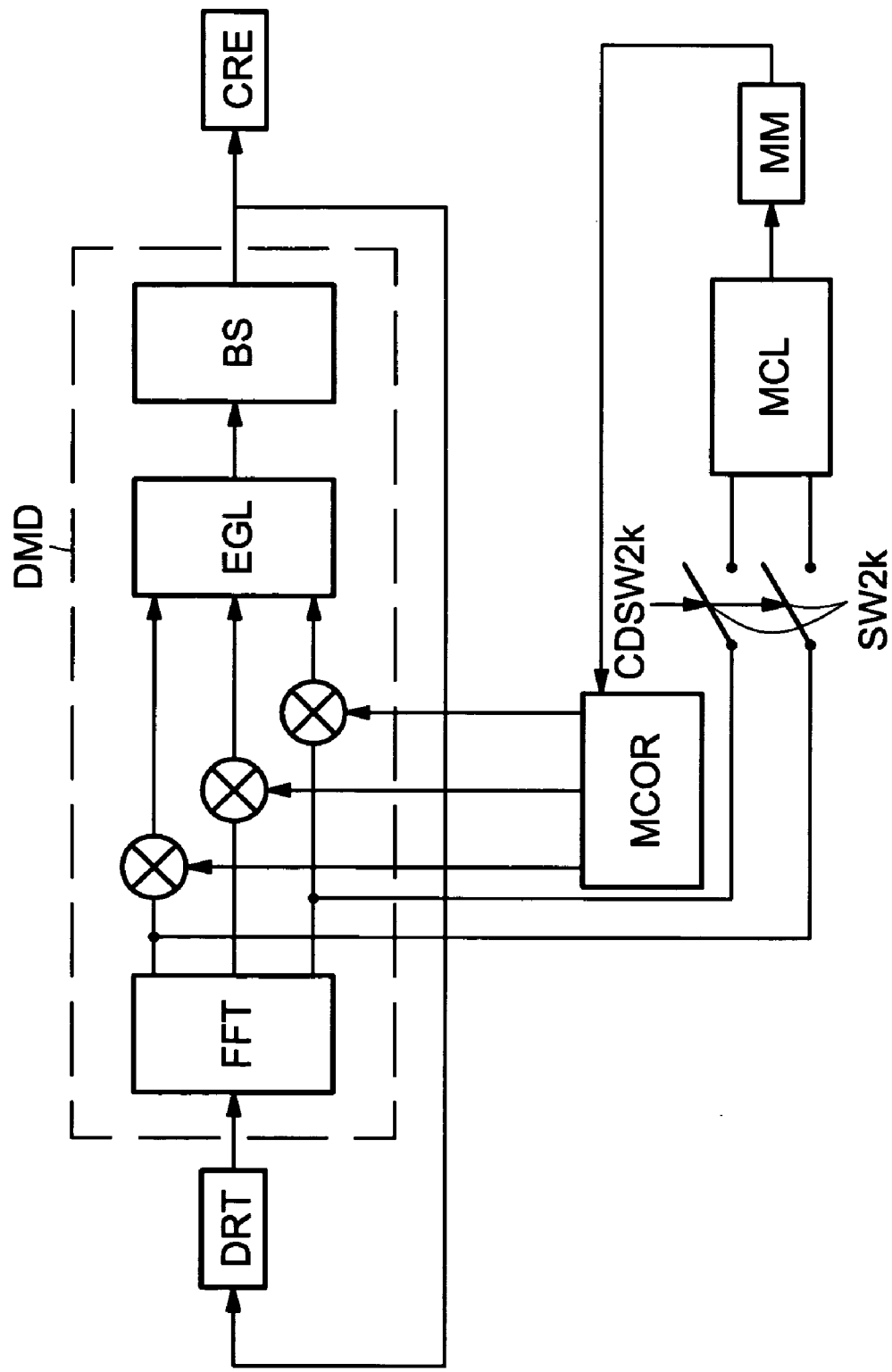
FIG. 2 is a block diagram illustrating in greater detail a portion of the device of FIG. 1.

The block BNR also comprises a control circuit CTL for transmitting the control signal CDSW1, as well as, as will be seen in greater detail now by referring more particularly to FIG. 2, the control signals CDSW2k. The functions of the control circuit may be embodied in software.

The demodulator DMD comprises at the head end a complex Fourier transform operator FFT receiving, at an input, the output from the correction circuit DRT. The complex operator FFT is of size N, and consequently delivers N outputs which are linked by way of N multipliers to an equalizer EGL of conventional structure. This equalizer EGL is followed by a carrier-related synchronization loop BS, likewise of conventional structure. The output of the loop BS is linked to the error correction stage CRE, and to the input of the correction circuit DRT.

In the case where the device processes a signal in accordance with 802.11A standard, the size N of the Fourier transform is at least equal to 64, while N is at least equal to 2048 or 8192 for a signal in accordance with the DVB-T specification.

During a calibration phase, the input of the filter FLT at the intermediate frequency is linked to the terminal E2 (FIG. 1) and will receive a set of N calibration frequency lines SETk, with k varying from 0 to N-1, as transmitted by the generator GEN. The frequency of the line of index k, $f_1(k)$ is chosen so that after transposition by the stage MX2IR and MX2QR, the line exhibits a frequency corresponding to an analysis point of the Fourier transform which is used in the process for digitally demodulating the signal modulated by the OFDM modulation for example. More precisely, this analysis frequency is equal to kFe/N, where Fe designates the sampling frequency of the complex FFT operator.

During the calibration phase, the N outputs of the operator FFT are connected respectively in succession to a calculation circuit MCL by switches SW2k respectively controlled by the control signals CDSW2k. More precisely, the calculation circuit MCL calculates the amplitude A(k) and the phase Phi(k) of the corresponding point at the output of the operator FFT. These pairs correspond to the mismatches, estimated in the spectral domain of the I and Q paths.

Each point k is a complex number and the calculation circuit MCL can use from among numerous possible approaches, two conventional approaches for determining the amplitude and the phase of a complex number a+jk. A first approach includes using tables in memory for storing the amplitude/phase values as a function of the values a and b.

A second approach includes implementing in the calculation circuit MCL a specific algorithm known to the person skilled in the art by the name CORDIC (Coordinate Rotation Digital Computer), published in the Journal IRE Trans. Electron. Comput. EC-8, pages 330–334 (J. Volder-1959).

Next, for each point k, the amplitude and the phase are stored in a memory MM. It is also possible to incorporate a filtering stage between the calculation circuit MCL and the memory MM. During the phase of reception of the incident signal SI, correction circuit MCOR then estimates all the pairs 1/A(k) and −Phi(k), that is, the inverse of the amplitude and the opposite of the phase.

Also, each output k of the operator FFT is then multiplied in the SI signal reception phase by the product (1/A(k)) exp(−j Phi(k)).

Among the usable bandpass filters, some require specific calibration to determine their amplitude response, and possibly, their center frequency. Such is the case in particular for the filters of the bulk acoustic wave type (BAW filters).

The filters of the bulk acoustic wave type are known to the person skilled in the art. They are for example formed of at least two resonators of the bulk acoustic wave type, also sometimes loosely referred to as a piezoelectric resonator.

Such resonators are for example described in the article by Sang-Hee Kim et al., entitled "AlN-Based Film Bulk Acoustic Resonator Devices With W/SiO2 Multilayers Reflector For RF Bandpass Filter Application", J. Vac. Sci. Technol. B 19(4), July/August 2001, in the article by K. M. Lakin entitled "Thin Film Resonators And Filters", 1999 IEEE ULTRASONICS SYMPOSIUM, p. 895–906. Moreover, the latter article illustrates the embodiment of filters of the BAW type, formed of several resonators arranged ladder-like.

The center frequency of an FBAW filter (FIG. 3) is not defined accurately on the basis of the technological characteristics and dimensioning of the resonators. Only the bandwidth of the filter is well defined. Hence, the invention provides additional calibration to determine this center frequency as well as to determine the amplitude response of the filter.

Figure 3:
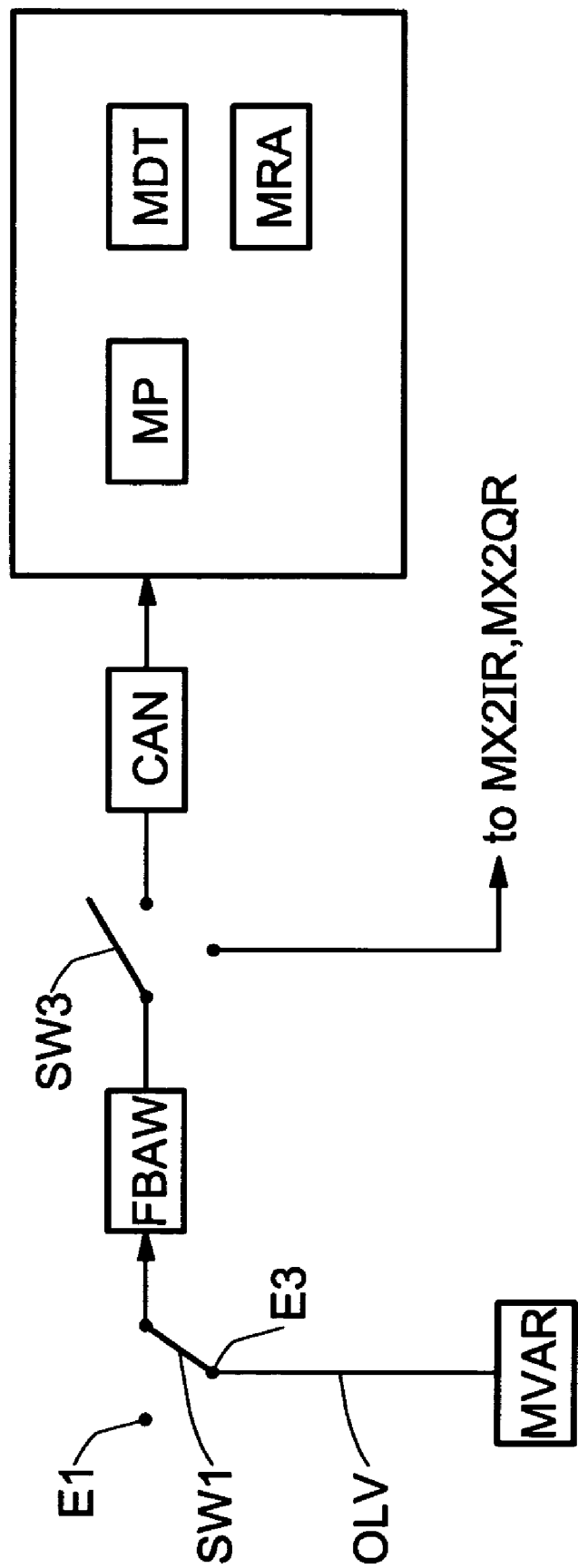
FIG. 3 is a block diagram illustrating in greater detail a first embodiment providing for specific calibration of the filter according to the invention.

An exemplary embodiment of such additional calibration circuit is illustrated in FIG. 3. Circuit MVAR delivers a gauging transposition signal OLV and varies the frequency of this signal around the presumed center frequency of the FBAW filter.

In this phase of additional calibration, a switch SW3 links the output of the filter FBAW, not to the mixers MX2IR and MX2QR, but to the input of an analog/digital converter ADC linked at its output to a power detect circuit MP for detecting for each value of the frequency of the gauging signal OLV, the power of the signal at the output of the bulk acoustic wave filter FBAW.

Next, a power detect circuit MDT will detect the maximum power, and the center frequency of the filter FBAW is then the frequency of the gauging signal corresponding to this maximum value of power. By way of example, the power detect circuit MP can calculate the power of the signal by calculating for example the modulus thereof. A simplified way of calculating the modulus of the signal is provided by the formula below:

$$\text{Modulus}(S) = \text{Max}(abs(S)) + \tfrac{1}{2}\,\text{Min}\,(abs(S)).$$

In this formula, Max designates the maximum value, Min designates the minimum value and abs designates the absolute value, and S is the signal delivered by the analog digital converter ADC.

Also provided is a conventional amplitude circuit MRA to determine for each value of the frequency of the transposition signal OLV, the amplitude response of the filter. Also, in the phase of calibration of the device DIS, making it possible to estimate the mismatches of the I and Q paths, the calculation circuit MCL will not only calculate the amplitudes A(k) of the N outputs of the operator FFT, but correct these amplitudes though the amplitude response of the filter FBAW.

In the incident signal reception phase, each of the outputs of the operator FFT will be corrected with the inverse of the corresponding amplitude calculated in the calibration phase and corrected by the amplitude response of the filter, as well as with the opposite of the corresponding phase calculated in the calibration phase.

Figure 4:
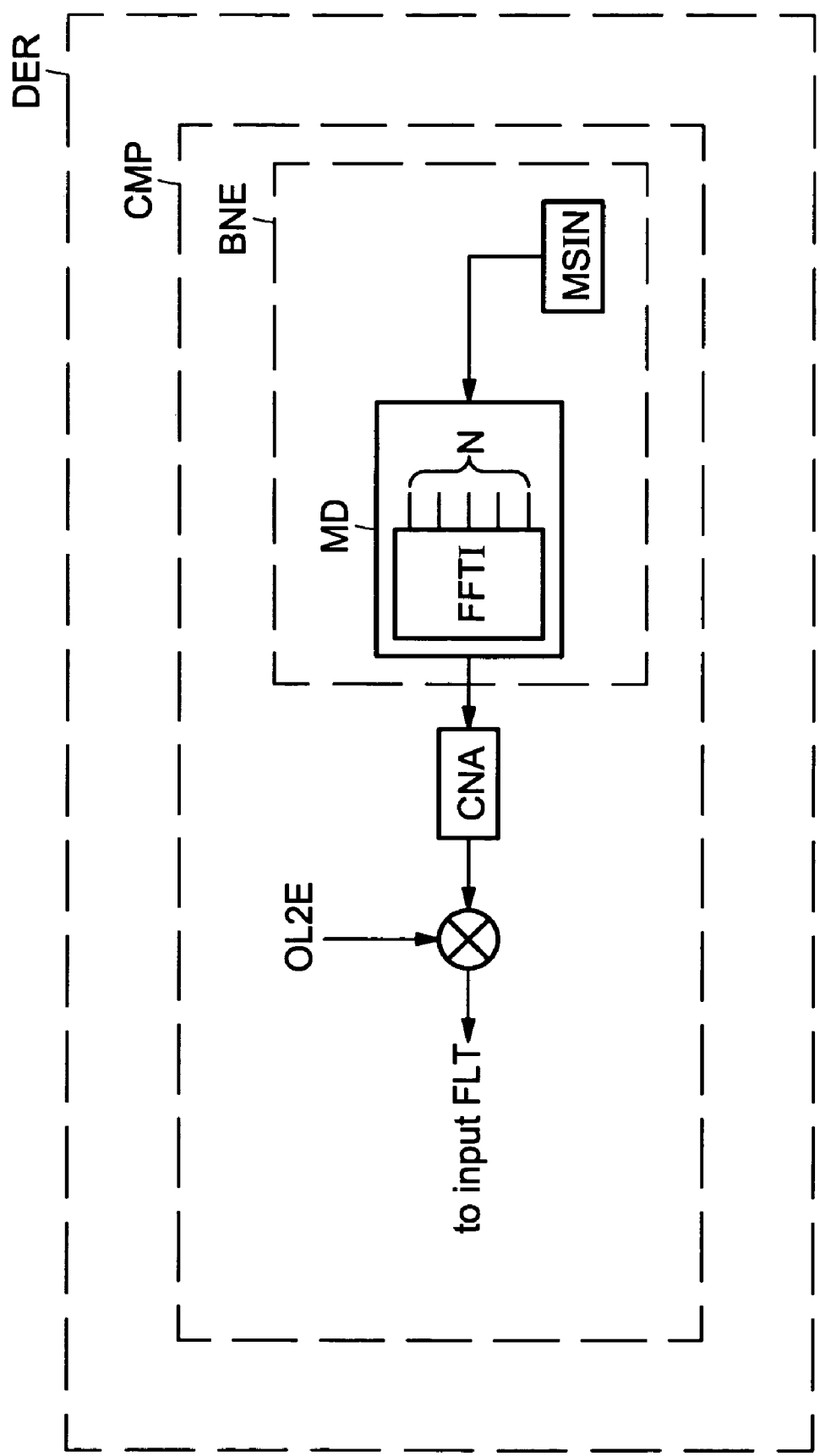
FIG. 4 is a block diagram illustrating a second embodiment providing calibration of the device according to the invention.

When the device DIS is incorporated within a receiver RDS of digital television signals, it is possible to use an autonomous synthesizer centered on the intermediate frequency Fi as a generator GEN. In the case of a bidirectional system, in accordance for example with the 802.11A standard, the transmission/reception device DER for the signals situated for example in the 5 GHz–6 GHz bound, comprises, as illustrated in FIG. 4, a digital transmission module BNE comprising a modulator MD.

This modulator MD comprises a complex operator FFTI performing an inverse Fourier transform. The output of the modulator MD is linked to the input of a digital analog converter CNA whose output feeds into the up conversion path of the tuner TZ of the component. This up conversion path comprises a first frequency transposition stage receiving the transposition signal OL2E whose frequency is equal to the center frequency of the filter FLT.

In such systems, the frequency scanning of a frequency line can then advantageously be replaced by the generation of a unique calibration signal composed of the spectrum of the N frequency lines. More precisely, this unique calibration signal, equal for example to a sine comb, and in accordance with the formula below:

$$\sum_{k=0}^{N-1} \sin(2\pi fl(k))$$

is generated by a calibration circuit MSIN at the input of the operator FFTI.

The invention is not limited to the embodiments and modes of implementation just described but encompasses all variations thereof. Thus in the case of a tuner with a ZIF type architecture, the filter FLT does not exist and the calibration lines are delivered at the input of the transposition stage MX2IR and MX2QR. The transposition frequency of the signal OL2R is then equal to the center frequency of the desired channel and the filters FBBI and FBBQ select this channel in baseband.

That which is claimed is:

1. A method for processing an incident analog signal modulated on N carriers, the method comprising:
    performing a frequency transposition of an intermediate signal arising from the incident analog signal on two phase quadrature processing paths for providing an analog transposed signal, the frequency transposition being based upon a predetermined transposition frequency;
    converting the analog transposed signal to a digital transposed signal; and
    demodulating the digital transposed signal using a Fourier transform of size N, the demodulating comprising
        a calibration phase for generating N calibration frequency signals before the frequency transposition, the N calibration frequency signals having N calibration frequencies respectively corresponding after transposition to N analysis frequencies being input to a Fourier transform circuit, and for each analysis frequency calculating an amplitude and a phase of a corresponding point at an output of the Fourier transform circuit, and
        a reception phase for correcting outputs of the Fourier transform circuit with an inverse of the corresponding amplitude and an opposite of the corresponding phase calculated in the calibration phase.

2. A method according to claim 1, wherein the incident analog signal comprises a plurality of frequency channels; wherein the intermediate signal arises from the incident analog signal without prior frequency transposition; and wherein the predetermined transposition frequency is equal to a center frequency of a desired channel.

3. A method according to claim 1, further comprising filtering the analog incident signal centered on an intermediate frequency for delivering an intermediate signal; the predetermined intermediate frequency being equal to the intermediate frequency; and wherein the calibration frequency signals are generated at an input of a filter performing the filtering.

4. A method according to claim 3, further comprising performing an additional calibration of the filter for determining an amplitude response to the filter, and in the reception phase each of the outputs from the Fourier transform circuit is corrected with the inverse of the corresponding amplitude calculated in the calibration phase and corrected by an amplitude response of the filter, and with the opposite of the corresponding phase calculated in the calibration phase.

5. A method according to claim 4, wherein the analysis frequency is equal to kFe/N, with k varying from 0 to N-1, and Fe designating a sampling frequency of the Fourier transform circuit, and in the reception phase, the output k of the Fourier transform is multiplied by a complex product comprising opposite of a corresponding phase calculated in the calibration phase, and the inverse of the corresponding amplitude calculated in the calibration phase and corrected by the amplitude response of the filter.

6. A method according to one of claim 1, wherein an analysis frequency is equal to kFe/N, with k varying from 0 to N-1, and Fe designating a sampling frequency at an input of the Fourier transform circuit, and in the reception phase, the output k of the Fourier transform circuit is multiplied by a complex product comprising an inverse of the corresponding amplitude and an opposite of the corresponding phase calculated in the calibration phase.

7. A method according to claim 1, wherein in the calibration phase, the N calibration signals are generated in succession with an autonomous synthesizer.

8. A method according to claim 1, wherein the analog incident signal comprises a terrestrial or cable digital television signal.

9. A method according to claim 1, further comprising generating in the calibration phase a calibration signal comprising a spectrum of the N frequency signals, the generating being based on an inverse Fourier transform and a digital-to-analog conversion.

10. A method according to claim 1, wherein the modulation comprises an OFDM-type modulation.

11. A device for processing an incident analog signal modulated on N carriers comprising:
  a frequency transposition stage for receiving a transposition signal having a predetermined transposition frequency, and for performing a frequency transposition of an intermediate signal arising from the incident analog signal on two phase quadrature processing paths for providing an analog transposed signal;
  an analog-to-digital conversion stage for converting the analog transposed signal to a digital transposed signal; and
  a demodulation circuit for demodulating the digital transposed signal using a Fourier transform of size N, said demodulation circuit comprising
    a generating circuit for generating up stream of said frequency transposition stage and during a calibration phase, N calibration frequency signals having N calibration frequencies corresponding respectively after transposition to N analysis frequencies,
    a Fourier transform circuit for receiving as input the N calibration frequency signals,
    a calculation circuit for calculating for each analysis frequency an amplitude and a phase of a corresponding point of an output of said Fourier transform circuit, and
    a correction circuit for correcting during a reception phase outputs of said Fourier transform circuit with an inverse of the corresponding amplitude and an opposite of the corresponding phase calculated by said calculation circuit.

12. A device according to claim 11, wherein the incident analog signal comprises a plurality of frequency channels; wherein the intermediate signal arises from the incident analog signal without prior frequency transposition; and wherein the predetermined transposition frequency is equal to a center frequency of a desired channel.

13. A device according to claim 11, further comprising a filter for filtering the incident signal centered on an intermediate frequency for delivering an intermediate signal; wherein the predetermined transposition frequency is equal to the intermediate frequency; and wherein said generating circuit generates calibration frequency signals for input to said filter.

14. A device according to claim 13, further comprising an additional calibration circuit for performing an additional calibration of said filter for determining an amplitude response thereof, and in the reception phase said correction circuit corrects each of the outputs from said Fourier transform circuit with the inverse of the corresponding amplitude calculated in the calibration phase and corrected by an amplitude response of said filter, and with the opposite of the corresponding phase calculated in the calibration phase.

15. A device according to claim 14, wherein the analysis frequency is equal to kFe/n, with k varying from 0 to N-1, and Fe designating a sampling frequency of said Fourier transform circuit, and in the reception phase said correction circuit multiplies an output k of said Fourier transform circuit by a complex product comprising opposite of a corresponding phase calculated in the calibration phase, and the inverse of the corresponding amplitude calculated in the calibration phase and corrected by the amplitude response of said filter.

16. A device according to claim 14, wherein said filter comprises a bulk acoustic wave filter.

17. A device according to claim 11, wherein an analysis frequency is equal to kFe/N, with k varying from 0 to N-1, and Fe designating a sampling frequency of said Fourier transform circuit, and in the reception phase said correction circuit multiplies an output k of said Fourier transform circuit by a complex product comprising the inverse of the corresponding amplitude and the opposite of the corresponding phase calculated in the calibration phase.

18. A device according to claim 11, wherein said generating circuit comprises an autonomous analog synthesizer for generating in succession the N calibration signals.

19. A device according to claim 11, wherein said generating circuit comprises:
  an inverse Fourier transform circuit; and
  a digital-to-analog conversion stage connected to an output of said inverse Fourier transform circuit for generating a calibration signal comprising a spectrum of the N frequency signals.

20. A device according to claim 11, wherein the modulation comprises an OFDM-type modulation.

21. A device according to claim 11, wherein said frequency transposition stage, said analog-to-digital conversion stage and said demodulation circuit are formed on a substrate so that the device is an integrated circuit.

22. A receiver comprising:
a frequency transposition stage for receiving a transposition signal having a predetermined transposition frequency, and for performing a frequency transposition of an intermediate signal arising from an incident analog signal on two phase quadrature processing paths for providing an analog transposed signal;
an analog-to-digital conversion stage for converting the analog transposed signal to a digital transposed signal; and
a demodulation circuit for demodulating the digital transposed signal using a Fourier transform of size N, said demodulation circuit comprising
a generating circuit for generating up stream of said frequency transposition stage and during a calibration phase, N calibration frequency signals having N calibration frequencies corresponding respectively after transposition to N analysis frequencies,
a Fourier transform circuit for receiving as input the N calibration frequency signals,
a calculation circuit for calculating for each analysis frequency an amplitude and a phase of a corresponding point of an output of said Fourier transform circuit, and
a correction circuit for correcting during a reception phase outputs of said Fourier transform circuit with an inverse of the corresponding amplitude and an opposite of the corresponding phase calculated by said calculation circuit.

23. A receiver according to claim 22, wherein the incident analog signal comprises a plurality of frequency channels; wherein the intermediate signal arises from the incident analog signal without prior frequency transposition; and wherein the predetermined transposition frequency is equal to a center frequency of a desired channel.

24. A receiver according to claim 22, further comprising a filter for filtering the incident signal centered on an intermediate frequency for delivering an intermediate signal; wherein the predetermined transposition frequency is equal to the intermediate frequency; and wherein said generating circuit generates calibration frequency signals for input to said filter.

25. A receiver according to claim 24, further comprising an additional calibration circuit for performing an additional calibration of said filter for determining an amplitude response thereof, and in the reception phase said correction circuit corrects each of the outputs from said Fourier transform circuit with the inverse of the corresponding amplitude calculated in the calibration phase and corrected by an amplitude response of said filter, and with the opposite of the corresponding phase calculated in the calibration phase.

26. A receiver according to claim 25, wherein the analysis frequency is equal to kFe/n, with k varying from 0 to N-1, and Fe designating a sampling frequency of said Fourier transform circuit, and in the reception phase said correction circuit multiplies an output k of said Fourier transform circuit by a complex product comprising opposite of a corresponding phase calculated in the calibration phase, and the inverse of the corresponding amplitude calculated in the calibration phase and corrected by the amplitude response of said filter.

27. A receiver according to claim 25, wherein said filter comprises a bulk acoustic wave filter.

28. A receiver according to claim 22, wherein an analysis frequency is equal to kFe/N, with k varying from 0 to N-1, and Fe designating a sampling frequency of said Fourier transform circuit, and in the reception phase said correction circuit multiplies an output k of said Fourier transform circuit by a complex product comprising the inverse of the corresponding amplitude and the opposite of the corresponding phase.

29. A receiver according to claim 22, wherein said generating circuit comprises an autonomous analog synthesizer for generating in succession the N calibration signals.

30. A receiver according to claim 22, wherein said generating circuit comprises:
an inverse Fourier transform circuit; and
a digital-to-analog conversion stage connected to an output of said inverse Fourier transform circuit for generating a calibration signal comprising a spectrum of the N frequency signals.

31. A receiver according to claim 22, wherein the modulation comprises an OFDM-type modulation.

32. A receiver according to claim 22, wherein the receiver is configured as a digital television receiver for receiving at least one of terrestrial and cable digital television signals.

33. A receiver according to claim 22, wherein the receiver is configured to operate in a wireless local area network.

* * * * *

UNITED STATES PATENT AND TRADEMARK OFFICE
CERTIFICATE OF CORRECTION

PATENT NO. : 7,149,485 B2
APPLICATION NO. : 10/919796
DATED : December 12, 2006
INVENTOR(S) : Busson et al.

It is certified that error appears in the above-identified patent and that said Letters Patent is hereby corrected as shown below:

| | |
|---|---|
| Column 1, Line 40 | Delete: "it used"<br>Insert: --it is used-- |
| Column 2, Line 19 | Delete: "are calculated"<br>Insert: --is calculated-- |
| Column 3, Line 40 | Delete: "diagrams"<br>Insert: --diagram-- |
| Column 4, Line 42 | Delete: "illustrated"<br>Insert: --illustratively-- |
| Column 5, Line 35 | Delete: "will described"<br>Insert: --will be described-- |
| Column 6, Line 66 | Delete: "of an vehicle"<br>Insert: --of a vehicle-- |
| Column 7, Line 5 | Delete: "2001, in"<br>Insert: --2001, and in-- |
| Column 7, Line 28 | Delete: "not operation"<br>Insert: --not in operation-- |
| Column 7, Line 65 | Delete: "cause"<br>Insert: --causes-- |
| Column 9, Line 20 | Delete: "comprising opposite"<br>Insert: --comprising the opposite-- |
| Column 9, Line 24 | Delete: "one of" |
| Column 10, Line 37 | Delete: "comprising opposite"<br>Insert: --comprising the opposite-- |

UNITED STATES PATENT AND TRADEMARK OFFICE
CERTIFICATE OF CORRECTION

PATENT NO. : 7,149,485 B2
APPLICATION NO. : 10/919796
DATED : December 12, 2006
INVENTOR(S) : Busson et al.

It is certified that error appears in the above-identified patent and that said Letters Patent is hereby corrected as shown below:

Column 12, Line 12    Delete: "comprising opposite"
                      Insert: --comprising the opposite--

Signed and Sealed this

Seventh Day of August, 2007

JON W. DUDAS
*Director of the United States Patent and Trademark Office*

UNITED STATES PATENT AND TRADEMARK OFFICE
CERTIFICATE OF CORRECTION

PATENT NO. : 7,149,485 B2  Page 1 of 1
APPLICATION NO. : 10/919796
DATED : December 12, 2006
INVENTOR(S) : Busson et al.

It is certified that error appears in the above-identified patent and that said Letters Patent is hereby corrected as shown below:

| | |
|---|---|
| Column 2, Line 19 | Delete: "are calculated" Insert: --is calculated-- |
| Column 7, Line 5 | Delete: "2001, in" Insert: --2001, and in-- |
| Column 9, Line 20 | Delete: "comprising opposite" Insert: --comprising the opposite-- |
| Column 9, Line 24 | Delete: "one of" |
| Column 10, Line 37 | Delete: "comprising opposite" Insert: --comprising the opposite-- |
| Column 12, Line 12 | Delete: "comprising opposite" Insert: --comprising the opposite-- |

This certificate supersedes the Certificate of Correction issued August 7, 2007.

Signed and Sealed this

Nineteenth Day of February, 2008

JON W. DUDAS
*Director of the United States Patent and Trademark Office*